C. C. DEAN.
HARROW ATTACHMENT FOR CULTIVATORS.
APPLICATION FILED JAN. 5, 1914.
1,112,199.
Patented Sept. 29, 1914.
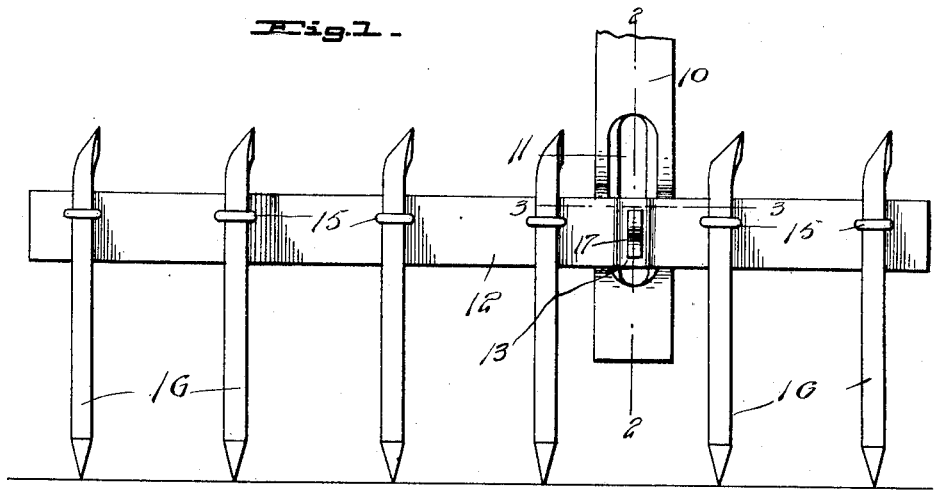
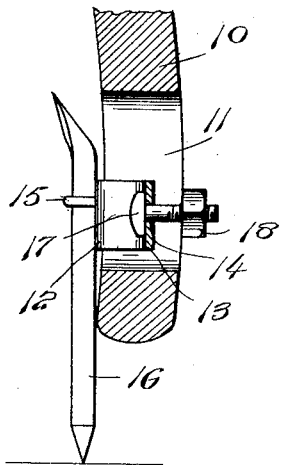
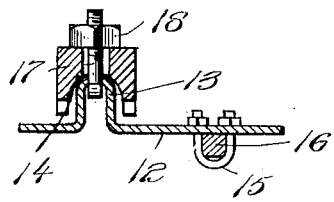
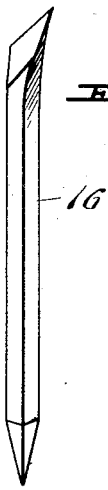
Witnesses
Inventor
C. C. Dean.
By
Attorneys

UNITED STATES PATENT OFFICE.

CHARLES C. DEAN, OF REMMEL, ARKANSAS.

HARROW ATTACHMENT FOR CULTIVATORS.

1,112,199.  Specification of Letters Patent.  Patented Sept. 29, 1914.

Application filed January 5, 1914. Serial No. 810,460.

*To all whom it may concern:*

Be it known that I, CHARLES C. DEAN, a citizen of the United States, residing at Remmel, in the county of Jackson, State of Arkansas, have invented certain new and useful Improvements in Harrow Attachments for Cultivators; and I do hereby declare the following to be a full, clear, and exact description of the invention, such as will enable others skilled in the art to which it appertains to make and use the same.

This invention relates to harrow attachments for cultivators.

The object of the invention resides in the provision of an attachment which can be associated with a cultivator with facility and when so associated will be efficient in use.

A further object of the invention resides in the provision of a harrow attachment which will be simple in construction and cheap to manufacture.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a view in elevation of a harrow attachment constructed in accordance with the invention, same being shown attached to the standard of the cultivator; Fig. 2, a section on the line 2—2 of Fig. 1; Fig. 3, a section on the line 3—3 of Fig. 1, and Fig. 4, a detail perspective view of one of the harrow teeth.

Referring to the drawings 10 indicates the standard of a cultivator which is provided with the usual slot 11. The harrow attachment is shown as comprising an elongated plate 12 having an offset portion 13 disposed intermediate its ends and provided with a bolt opening 14. Engaged through the plate 12 and disposed in the same horizontal plane are a plurality of U-shaped clips 15 through the medium of which harrow teeth 16 are secured to the plate 12 for adjustment vertically.

In securing the attachment to a cultivator the offset portion 13 is inserted in the slot 11 of the standard 10 and a bolt 17 passed through the slot 11 and through the opening 14 the head of the bolt engaging the plate 12 as will be obvious. A nut 18 is then engaged upon the bolt 17 and screwed against the standard 10 and in this manner the attachment is operatively secured to the standard.

What is claimed is:—

A harrow attachment for cultivators comprising an elongated plate having an intermediate offset portion provided with a bolt opening and adapted to seat in a slot in the standard of a cultivator, a plurality of U-shaped clips engaged through the plate and disposed in horizontal alinement and a plurality of teeth clamped to the plate by said clips for vertical adjustment.

In testimony whereof, I affix my signature, in the presence of two witnesses.

CHARLES C. DEAN.

Witnesses:
D. H. BURTON,
J. E. JOHNSON.

Copies of this patent may be obtained for five cents each, by addressing the "Commissioner of Patents, Washington, D. C."